UNITED STATES PATENT OFFICE 2,372,745

WIPING SOLDER ALLOYS

Albert A. Smith, Jr., Metuchen, N. J., assignor to American Smelting and Refining Company, New York, N. Y., a corporation of New Jersey No Drawing. Application July 17, 1942,
Serial No. 451,318

3 Claims. (Cl. 75—166)

This invention relates to lead base alloys and more particularly to quaternary alloys of Pb-Sn-Ag-Sb which are especially useful as wiping solders.

In making wiped solder connections, as in joining metal pipe sections, cable sheathing and the like, a solder having a relatively low melting point and fairly wide temperature range of plasticity is desired so that the solder can be readily wiped in place between the parts to be joined. Further, in order to be satisfactory, the solder must form a strong non-porous joint.

Ordinary Pb-Sn solders, for example, containing from 65 to 70% lead and 30 to 35% tin, are not suitable as wiping solders because the soldered joints formed from these binary alloys are usually porous and tend to develop leaks. Furthermore, the soldered joints exhibit low tensile strength and offer little resistance to creep. Some attempts have been made, heretofore, to overcome the excessive porosity of these alloys, such as, for instance, by incorporating a small amount of arsenic to exert a grain refining effect. The addition of arsenic to this type of alloy reduces the porosity of the solder but the other disadvantages are not avoided.

It is an object of this invention to provide an improved alloy composition of the character described which exhibits superior properties as a solder whereby non-porous wiped joints having high tensile strength and excellent resistance to creep are readily produced.

Another object of this invention is to provide an alloy having a lower melting point than ordinary 70-30 Pb-Sn solder and which is particularly adapted for use as a wiping solder to form strong, non-porous corrosion resistant joints.

Another object is to provide an improved solder which has a wide temperature range of plasticity and low liquidus temperature whereby it can be used with ease to produce sound wiped solder joints of high tensile strength. Other objects and advantages of this invention will become apparent as the description proceeds.

Typical examples of the quaternary alloys which serve to illustrate the invention are given in the following table, together with some of the salient physical properties which have been determined. For comparison, corresponding values found for similar binary Pb-Sn alloys are included.

Solder alloy composition and physical properties

| Composition, per cent | | | | Liquidus, °C. | Solidus, °C. | Tensile strength, p. s. i. |
|---|---|---|---|---|---|---|
| Pb | Sn | Ag | Sb | | | |
| 70 | 30 | --- | --- | 257 | 183 | 5,390 |
| 68¾ | 30 | 1¼ | --- | 251 | 176 | 7,625 |
| 66¾ | 30 | 1¼ | 2 | 246 | 180 | 8,125 |
| 80 | 20 | --- | --- | 275 | 183 | 4,940 |
| 78¾ | 20 | 1¼ | --- | 268 | 176 | 5,620 |
| 78¼ | 20 | 1¼ | ½ | 266 | 177 | 6,720 |

The tin content of the alloy is preferably held to the minimum amount required to provide a solder exhibiting good spreading and adhesive qualities. Tin functions together with the lead and antimony to impart a high degree of toughness and flexibility to the solder. A range of from 5 to 40% tin may be used, but the preferred amount is about 30%.

The addition of antimony to the Pb-Sn base alloy decreases the spreading power; however, its presence lowers the melting point of the composition and markedly increases its strength which is much desired. This is illustrated in the examples given in the above table. Antimony also co-acts with silver to control the grain size and growth whereby sound, non-porous soldered joints are readily produced. The amount of antimony added may range from 0.50% to 3%. A percentage amount of approximately 2% is preferred inasmuch as this amount has been found to be very effective in producing the desired results.

Silver added to the Pb-Sn base alloy lowers the liquidus temperature and increases the spreading power. This offsets the decrease in spreading power brought about by the addition of antimony. The presence of even a small percentage of silver has been found to greatly increase the resistance of Pb-Sn base alloys to corrosion. This becomes an important factor when the soldered joint is required to withstand the action of corrosive substances in use. Silver also increases the hardness and tensile strength of the alloy and, as mentioned above, exerts a grain refining effect. The amount of silver incorporated may range from 0.5% to 5.0%. Test data indicate that about 1¼% of silver produces the most desirable results and this is the preferred amount used.

A particularly good wiping solder of my invention consists of an alloy containing approximately 30% tin, 2% antimony, 1¼% silver and the balance lead. This alloy has a lower liquidus temperature than 70-30 or 80-20 Pb-Sn solder as shown in the table, and exhibits a markedly higher tensile strength than the ordinary binary alloys of Pb and Sn. The solder spreads satisfactorily and the temperature range in which the solder is plastic is about 66° C. This range is wide enough to permit working of the solder in the usual manner to produce good wiped joints. In making wiped joints on lead sheathing with solders which have a narrow temperature range of plasticity and relatively high melting point, it is very difficult to produce satisfactory joints because the solder must be worked rapidly and great care is necessary to prevent damage to the lead sheathing and insulation. This difficulty has been substantially overcome by the improved solder of this invention.

The alloy solder compositions of the invention may be readily compounded by the conventional methods employed by those skilled in the art for producing ordinary lead-tin solders. It will be also apparent, from the data and description given, that the Pb-Sn-Ag-Sb alloys of this invention possess and exhibit properties which make them suitable for various uses other than as solders, and such other uses are intended to come within the scope of the present invention as defined by the appended claims.

What is claimed is:

1. A relatively low melting point alloy soldering composition which consists principally of lead, tin, silver and antimony, said constituents approximating from 5% to 40% tin, 0.5% to 5% silver, 0.5% to 3% antimony with the balance of the alloy composition being made up substantially all of lead.

2. An alloy soldering composition consisting of approximately 30% tin, 1¼% silver, 2% antimony and the balance substantially all lead.

3. An alloy soldering composition adapted for use as a wiping solder made up principally of lead, tin, silver and antimony, said constituents being in the approximate percentage amounts by weight of 20 to 30% tin, 0.5 to 5% silver and 0.5 to 3% antimony with the balance substantially all lead.

ALBERT A. SMITH, JR.